Aug. 13, 1946.　　　R. E. MULLENDORE　　　2,405,601
AZIMUTH SCALE
Filed Feb. 23, 1945　　　3 Sheets-Sheet 1

*INVENTOR.*
RALPH E. MULLENDORE
BY　*M. O. Hayes*
　　*ATTORNEY*

Aug. 13, 1946.   R. E. MULLENDORE   2,405,601
AZIMUTH SCALE
Filed Feb. 23, 1945   3 Sheets-Sheet 2

Inventor
Ralph E. Mullendore
By
Attorney

UNITED STATES PATENT OFFICE 2,405,601

AZIMUTH SCALE

Ralph E. Mullendore, United States Navy

Application February 23, 1945, Serial No. 579,480

3 Claims. (Cl. 235—84)

(Granted under the act of March 3, 1883, as amended April 30, 1928; 370 O. G. 757)

This invention relates to improvements in computers, and more specifically to computers for quickly solving the celestial triangle for azimuth in navigation problems.

Various tables and graphs are available for computing azimuth, and while they provide a satisfactory and accurate means for solving the celestial triangle, even after one becomes thoroughly familiar with the handling of the tables or graphs, it takes considerable time to carry through the computations due to the necessity for interpolations between values or for following through closely spaced lines on a graph.

It is an object of this invention to provide a mechanical computer designed to assist in solving the celestial triangle for values of azimuth rapidly and which is of such simple construction and operation as to permit mastery of its use in a short time.

The invention as illustrated herein, resides in a plurality of concentrically arranged discs having scales inscribed thereon, two of the scales having values thereon which when properly indexed by relative rotation of the discs are additive to give the azimuth of any given local apparent time for a given latitude and declination and means for indexing the aforesaid two scales which comprises two pairs of cooperating scales, the indexing of the two scales being effected by rotation of each of the pairs of scales relative to each other to set in on said scales the sum of the latitude and declination opposite the difference of the latitude and declination. More specifically, the discs are enclosed in a transparent plastic case and include in addition to the aforementioned scales, a fixed time scale and a sweep arm which may be set opposite any time indicated on the time scale and under which may be observed the azimuth for that particular time when the scales are indexed, as related heretofore. In the form of the invention illustrated, the case consists of a pair of juxtaposed plates held together and in spaced relation by a spacer member and fastening means. Spindles are journalled in the opposite plates to which the movable discs are secured for rotation with respect to each other and other discs which are fixed to the plates, the discs being so arranged that four scales are assembled at the front of the computer and two at the rear of the computer.

The invention will now be described in detail with reference to the accompanying drawings, in which.

Figure 3:
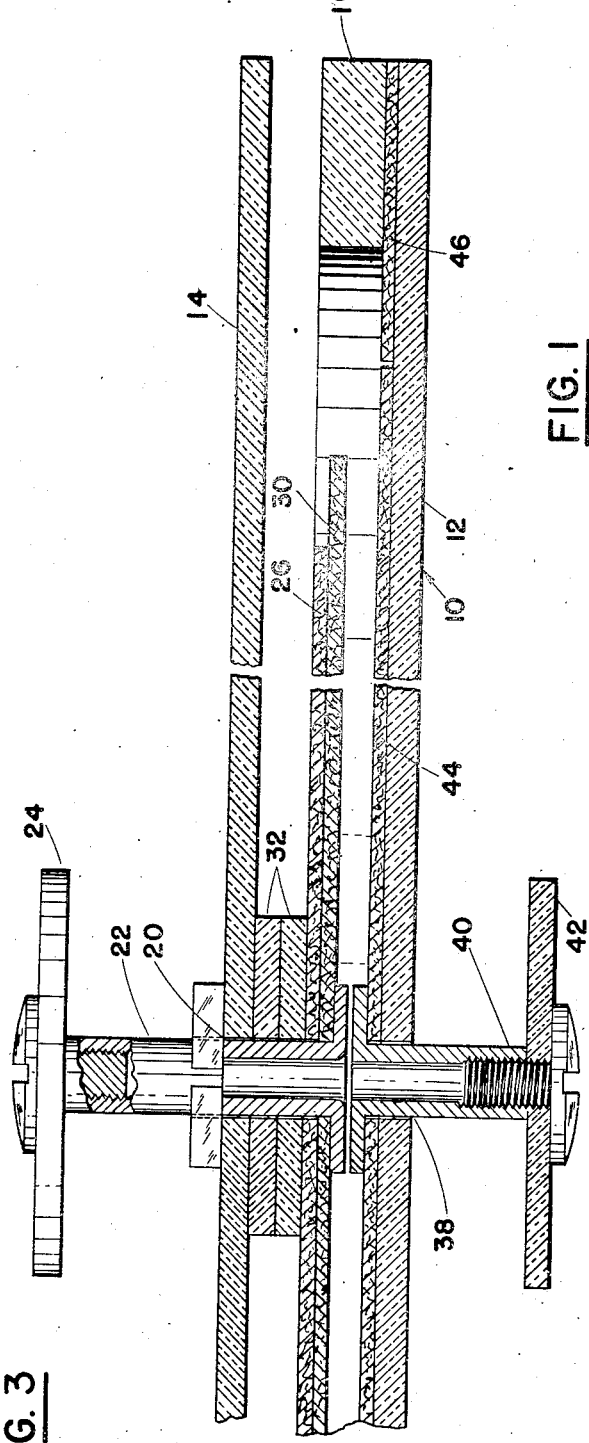
Fig. 3 is a section through the computer.

This instrument is designed to supply the need for a compact device which may mechanically be operated to solve the equations employed in the solution of the celestial triangle for values of azimuth for any given local apparent time and to make these solutions available directly for all possible values of declination and latitude without the work of interpolation, at present necessary in using tabulated or graphical solutions.

There are a number of formulae for solving the spherical triangle which are analogous to those, for solving the plane triangle, and in the present instance, the solution of the spherical triangle is arrived at through the use of Napier's arrangement of the equations for solving for one side of a triangle when two sides and the included angle is known.

The equations referred to and which are employed in the present invention are:

$$\text{Tan } A = \cot \tfrac{1}{2}\varphi \ \text{Csc } \tfrac{1}{2}(P+coL) \sin \tfrac{1}{2}(P-coL)$$

$$\text{Tan } B = \cot \tfrac{1}{2}\varphi \ \text{Sec } \tfrac{1}{2}(P+coL) \cos \tfrac{1}{2}(P-coL)$$

from which azimuth may be derived by algebraically adding the values of A and B. In the aforesaid formulae $\varphi$ is the hour angle (H. A.) or local apparent time (L. A. T.); P is polar distance or 90±declination; and coL is co-latitude or 90—latitude. The independent terms of the two equations are components of a product, and as such, are additive when treated as logarithmic functions. The addition of the logarithms may be performed numerically. However, this addition may be performed equally well by scaling off distances, in predetermined units of measure, equivalent to the logarithms. If these scaler distances are laid down consecutively, the total distance measured will be equivalent in the same units of measure, to the logarithms of the product. It will follow then that these distances could be laid off along a straight line, or preferably for the purpose of the present invention along the circumference of a circle.

If the type of function of a variable entering into these calculations is known beforehand, then a complete scale may be prepared and indexed for all possible values of the function. The scale may equally well be prepared for values of the function, but indexed in terms of the variable directly. That is, the scale which is designated for cot ½ $\varphi$, is constructed by laying off the values of log cot ½ $\varphi$, the values plotted, however, being indexed directly as $\varphi$. The scale which is designated for csc ½ $(P+coL)$, is formed by laying off values of the log of csc ½ $(P+coL)$ on the scale and indexing it directly as $(P+coL)$ or since $(P+coL)$ is equal to [(90—declination)+(90—latitude)] which in turn is equal to 180—(declination~latitude) it may be indexed directly as (declination~latitude).

Examination of the two equations will show that there are seven different functions involved since cot ½ $\varphi$ is common to both. Each of the scales may be laid off along the circumference of a circle, as described above, by first determining the maximum and minimum probable values of each function so as best to gauge the unit of measure for the maximum definition of the graduations on the completed scales.

The computer, which is to include the function described above, is to consist of a concentric grouping of logarithmically graduated scales, and is so designed and constructed that once the scales are indexed for a given condition of declination and latitude, the azimuths corresponding to all the successive hour angles (L. A. T.) will be directly obtainable without further adjustment of the scales. New adjustments are necessary only upon a change of declination and/or latitude. The unit of measurement used is such that one logarithmic cycle covers 120° of arc along the circumference of the circle. The seven logarithmic scales which compose the computer and represent the various functions of the formulae referred to, their range, direction, terms in which indexed, and degree of division to which they are plotted, will now be described as follows:

"Time" cot ½ $\varphi$: range 0400 to 1158, plotted clockwise and 1202 to 2000, plotted counter-clockwise; indexed in minutes of L. A. T.; divisions 2 minutes to 0.2 minute.

"A" tan A: range 0.2 degrees to 89.8°; plotted clockwise; indexed in degrees of A; divisions 0.1 deg. to 0.2 deg.

"B" tan B: range 0.2 deg. to 89.8 deg.; plotted clockwise; indexed in degrees of B; divisions 0.1 deg. to 0.2 deg.

"F1" cos ½ $(P-coL)$; range 0 to 90 degrees; plotted clockwise; indexed in degrees of (lat.~decl.) or (lat.+decl.); divisions 15 degrees to 2 degrees.

"F2" sec ½ $(P+coL)$: range 0.4 degree to 180 degrees; plotted counter-clockwise; indexed in degrees of (lat.+decl.) or (lat.~decl.); divisions 0.2 degree to 10 degrees.

"R1" csc ½ $(P+coL)$: range 0 to 179.2 degrees; plotted clockwise; indexed in degrees of (lat.+decl.) or (lat.~decl.); divisions 10 degrees to 0.1 degree.

"R2" sin ½ $(P-coL)$: range 0.8 degree to 90 degrees; plotted counter-clockwise; indexed in degrees of (lat.~decl.) or (lat.+decl.); divisions 0.1 degree to 2 degrees.

To facilitate description of the operation of the instrument, the seven logarithmic scales are denoted as "Time," F1, F2, R1, R2, A and B, as denoted above. These scales are arranged so that the three scales, "Time," F1 and R1 are fixed to a transparent case and the four scales A, B, F2 and R2 are mounted on two moving dials within the casing. These seven scales are so arranged that five of the scales are read from the front of the instrument and two of the scales are read from the reverse of the instrument. The time scale on which are inscribed values of cot ½ $\varphi$ is fixed to the instrument case to be read from the front and is the scale of longest diameter. The "A" scale which represents the values of tangent A is inscribed on the larger of the two movable dials. The "A" scale is the only scale inscribed on this dial and is intended to be read from the front. It turns adjacent to and just inside of the "Time" scale. The B scale which represents values of tangent B is inscribed on the smaller of the movable dials to be read from the front of the instrument and turns adjacent to and inside of the A scale. The F1 scale which represents values of csc ½ $(P-coL)$, is fixed to the case to be read from the front. This scale is a short segment of an arc and is secured to the case so that it extends over and blanks out the A and B scales in that section near the values representing noon when azimuth calculations are unreliable. The F1 scale is plotted on the same radius as the B scale. It is adjacent to and just outside of the F2 scale. The F2 scale which represents values of sec ½ $(P+coL)$ is inscribed on the smaller of the two movable dials. It is intended to be read from the front and to be indexed against the F1 scale. It is adjacent to and just inside of the B scale as well as the F1 scale. The R1 scale which represents values of csc ½ $(P+coL)$ is fixed to the instrument case and is read from the reverse side. This scale has the same diameter as that used for the time scale. The R2 scale which represents values of sin ½ $(P-coL)$ is inscribed to the reverse side of the larger movable dial. It is read from the reverse side of the instrument and is indexed against the R1 scale, but is adjacent to and just inside of the R1 scale.

Figure 1:
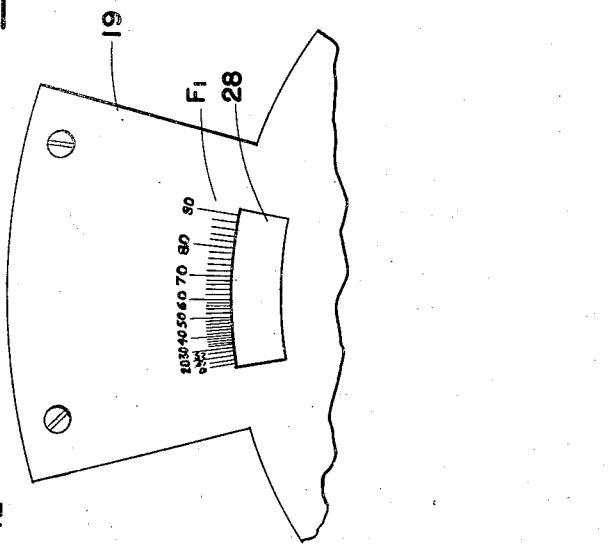
Fig. 1 is a fragmentary section of the computer illustrating the scale representing logarithmic values of csc ½ $(P-coL)$.
Figure 2:
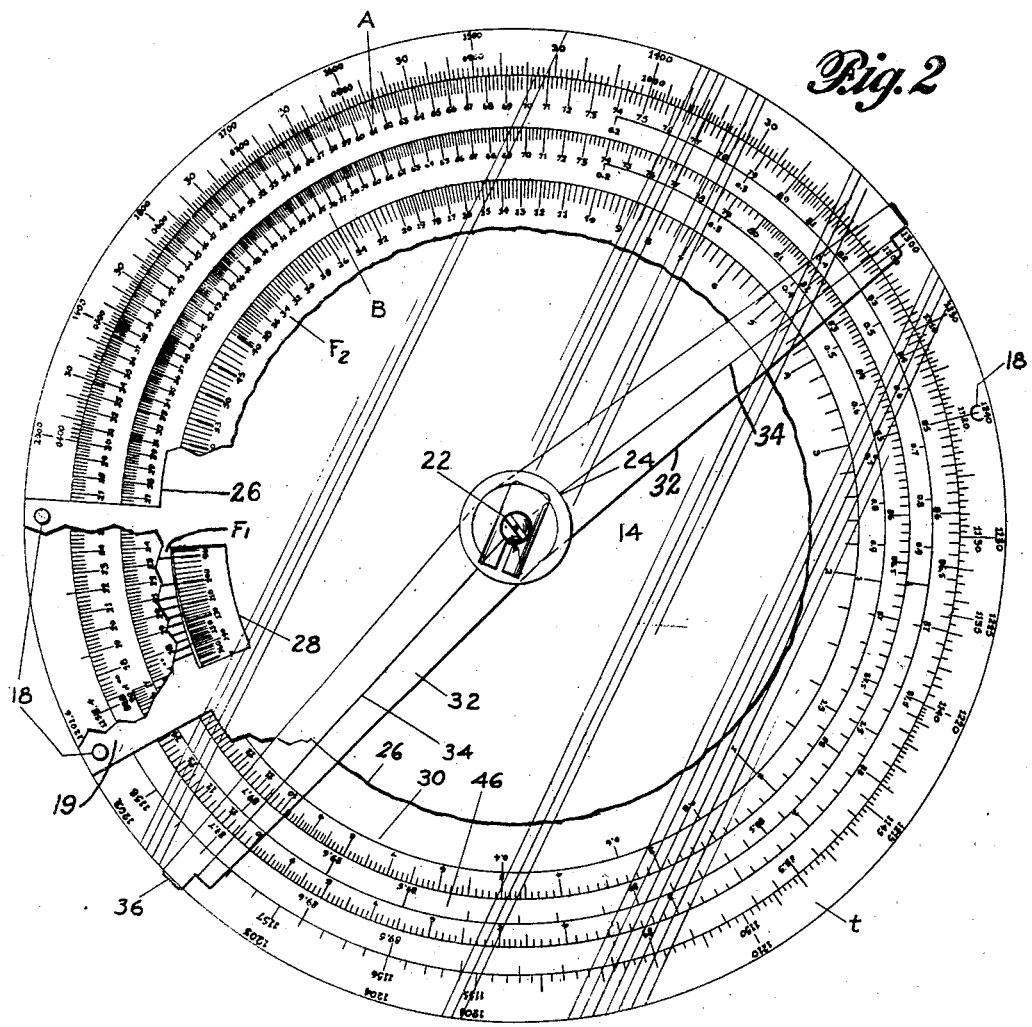
Fig. 2 is a plan view of the front face of the computer showing the arrangement of the logarithmic value of the various scales and the sweep arm.
Figure 4:
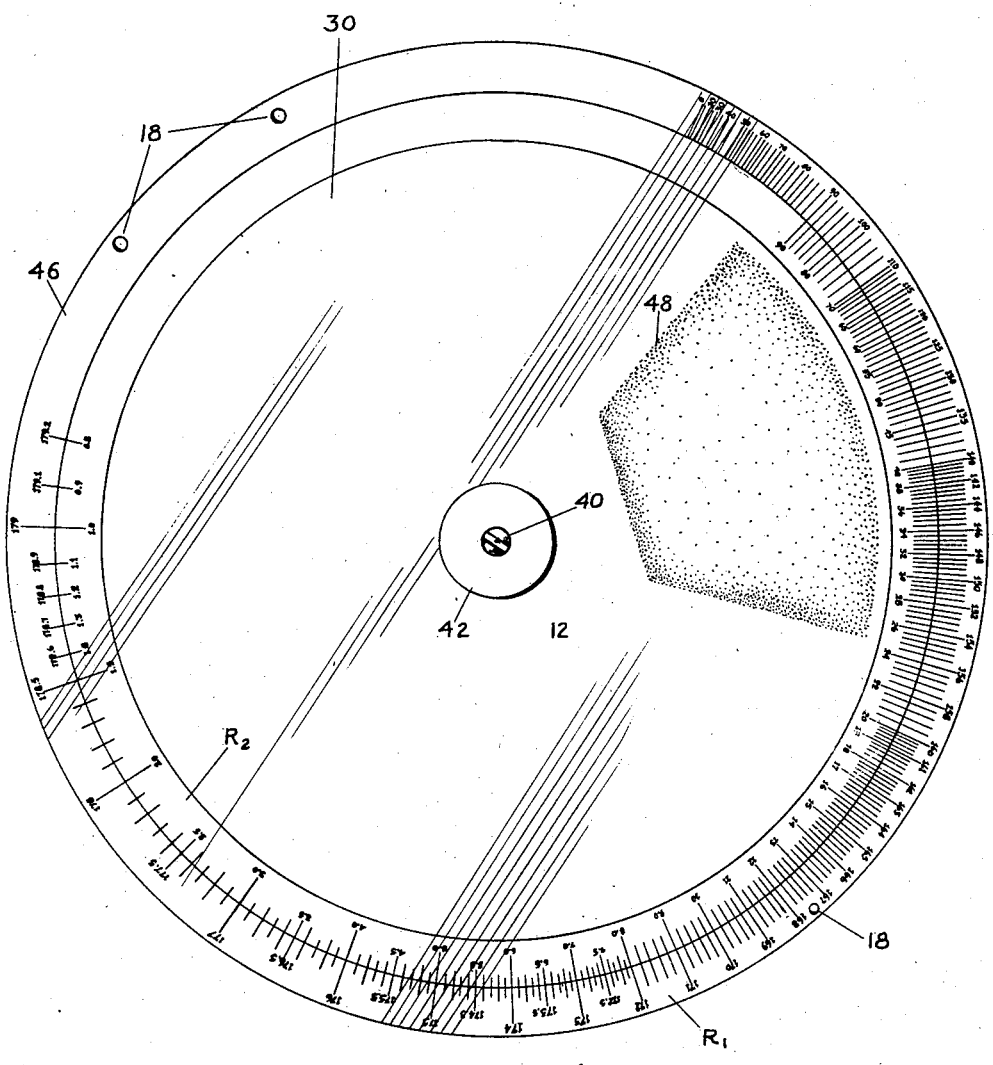
Fig. 4 is a plan view of the bottom side of the computer showing the logarithmic scales on the back side of the instrument.

As constructed, the aforesaid scales are enclosed in a transparent case 10, Fig. 2, which consists of a pair of transparent circular plates 12 and 14, which may be composed of a plastic material, held in spaced relation to each other by an annular member 16, Fig. 3, of such a diameter as to repose between the circular plates near their peripheral edges. A plurality of screws 18 are provided for securing the plates 12 and 14 and the spacer 16 together to form a rigid case. In the front plate 14, and centrally thereof, there is formed an aperture 20 through which there is passed a shaft 22 having a knob 24 thereon. On the inner end of this shaft, adjacent to the inner surface of the plate 14, there is disposed a disc shaped member 26 of relatively small diameter having a radially extending tab 19 which extends to the peripheral edge of the casing and is clamped together with the ring 16 by means of the screws 18 so that it is fixed with relation to the case. On this disc 26, there is inscribed the logarithmic scale F1, as shown in Fig. 1, the scale being formed on the tab 19 of the disc. Below the scale F1, in the tab 19, there is formed a window 28 of substantially arcuate shape for a purpose to be hereinafter described. Inwardly of the disc 26, there is mounted on the shaft 22 a second disc 30 of larger diameter than the disc 26, this disc, however, being frictionally engaged with the shaft 22 so that by rotation of the shaft, the disc in turn may be rotated relative to the disc 26. On this disc there are inscribed two scales in concentric arrangement, one of the scales being the values of F2 and the other the values B. The scale representing values of F2 is so positioned on the disc 30, that except for the portion beneath the window 28, this scale is hidden by the disc 26. The scale B, however, is formed on that portion of the disc 30 which extends beyond the peripheral edge of the disc 26. There is also mounted on the shaft 22, and freely rotatable thereon, one or more sweep arms 32 having finder lines 34 thereon. The sweep arms 32 extend radially from the shaft 22 and terminate at 36, just beyond the peripheral edge of the casing, thereby providing a finger hold so that the operator may turn the sweep arms about the shaft 22. Centrally of the plate 12 there is formed an aperture 38 through which there is passed a shaft 40 having a knob 42 thereon. On the inner end of the shaft 40 there is fixed a disc 44 which is of larger diameter than the disc 30 and has inscribed on opposite sides, the A scale and the R2 scale, the A scale being visible through the front plate 14 and the R2 scale being visible through the back plate 12. The A scale is so positioned on the disc 44 that it circumscribes the B scale. In addition to the aforesaid discs and cooperable therewith is an annular member 46 fixed to the inner surface of the plate 12. The annular member 46 is of such diameter as to circumscribe the disc 44 and on the opposite faces of this annular member are inscribed the "Time" scale and the R1 scale, the time scale being visible through the plate 14 and the R1 scale being visible through the plate 12.

On the back of the plate 12, the surface is etched to provide a fogged area 48 in the shape of a truncated wedge, although the shape of the area is not important. This provides a convenient place for the person using the computer to jot down with pencil, data and simple calculations, and to record latitude, longitude and time incident to the manipulation of the computer.

Prior to using the computer, it is necessary to know the latitude value and name (North or South), of the observer's position, as well as the declination value and name (North or South), of the celestial body concerned. With the latitude and declination known, the two values are used to find the sum and difference of latitude and declination, and these two values are used to index or orient the movable dials against the fixed portion of the scale according to the following conditions:

| When latitude and declination Same name | (both N or both S) |
|---|---|
| Is read on scale Latitude+declination F2 To match against Latitude−declination F1 | Is read on scale R1 to match against R2 |

| When latitude and declination Contrary name (one N other S) | |
|---|---|
| Read on scale Latitude+declination F1 To match against Latitude−declination F2 | Read on scale R2 To match against R1 |

When the scales F2 and R2 have been oriented to scales F1 and R1, as indicated above, the Azimuth scale is in readiness to read all azimuths while the conditions of latitude and declination hold as used.

To find the azimuth for any given local apparent time—move one of the sweep arms 32 so as to set its hair line opposite the given L. A. T. on the Time scale. Having so set the finder arm, read the values beneath the hair line when it crosses the scales A and B. The azimuth will be equal to $A \pm B$ according to conditions of latitude and declination, sign and relative magnitude. The application form of $A \pm B$ is shown below.

When latitude and declination Same name

| Lat. greater than dec. | Azimuth=$A+B$ |
| Lat. less than dec. | Azimuth=$A-B$ |
| Lat. equal to dec. | Azimuth=$B$ |

Latitude and declination Contrary name

| Lat. greater than dec. | Azimuth=$A+B$ |
| Lat. less than dec. | Azimuth=$(A+180)-B$ |
| Lat. equal to dec. | Azimuth=$A+90°$ |

Subsequent azimuths may be found by moving the sweep arm to the new L. A. T. position and reading the indicated A and B. All azimuths are determined from the elevated pole, consequently:

In North latitude, when the body is rising or east of the meridian, the scale azimuths are reckoned from north to east; when the body is setting or west of the meridian, the scale azimuths are reckoned from north to west.

In South latitude, when the body is rising or east of the meridian, the scale azimuths are reckoned from south to east; when the body is setting or west of the meridian, the scale azimuths are reckoned from south to west.

The invention described herein may be manufactured and used by or for the Government of the United States of America for governmental purposes without the payment of any royalties thereon or therefor.

What is claimed is:

1. An azimuth computer, comprising a plurality of concentrically arranged discs having scales inscribed thereon, one of said scales having inscribed thereon values of time two of said scales having inscribed thereon values which when properly indexed with respect to each other and to the time scale are additive to give the azimuth of any given time on said time scale, and means for indexing said two scales, comprising two pairs of cooperating scales, one pair of scales for each of the aforesaid two scales, said two scales being indexed by rotation of the component parts of each pair of scales relative to each other to set the sum of the latitude and declination opposite the difference of the latitude and declination on each of said pairs of scales.

2. An azimuth computer, comprising a plurality of concentrically arranged discs, a transparent case adapted to enclose said discs and to permit relative rotation thereof, a time scale inscribed on one of said discs, degree scales inscribed on each of two other discs, said degree scales when properly indexed with respect to each other and the time scale being additive to give the azimuth values for the time which they oppose on the time scale, and means for indexing the degree scales comprising two pairs of cooperating scales, one pair for each of the aforesaid two degree scales, said two degree scales being indexed by rotation of the pairs of scales relative to each other to set in the sum of the latitude and declination opposite the difference of latitude and declination on each of said pair of scales.

3. An azimuth computer, comprising a plurality of concentrically arranged discs, a transparent case adapted to enclose said discs, said case consisting of a pair of juxtaposed plates held in spaced relation by a spacer member and securing means, means journalled in each of the plates for rotating some of the discs with respect to other of the discs which are fixed to the plates, said discs including a time scale with which there is associated a sweep arm adapted to be set opposite any given time on the time scale, and two scales marked off in degrees which when properly indexed with respect to each other and with the time scales are additive to give a value of azimuth for a given latitude and declination for any time on the time scale picked off by the sweep arm, and means for indexing said two scales which includes two pairs of cooperating scales, one pair for each of said two scales, said two scales being indexed by relative rotation of said pairs of scales to set in the sum of the latitude and declination opposite the difference of latitude and declination.

RALPH E. MULLENDORE.